Aug. 29, 1967 S. M. DOCKERTY 3,338,696
SHEET FORMING APPARATUS
Filed May 6, 1964
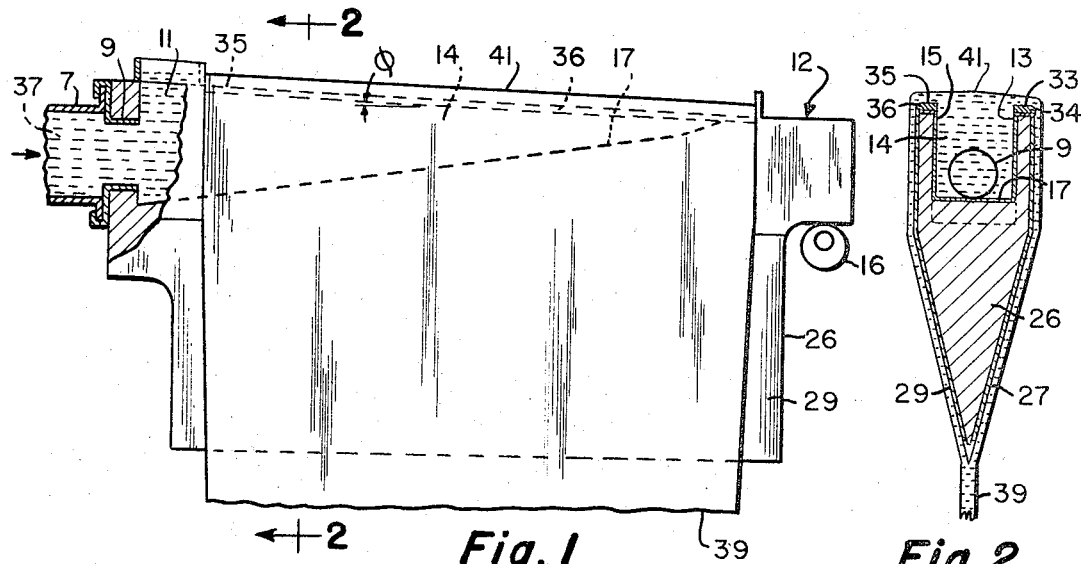
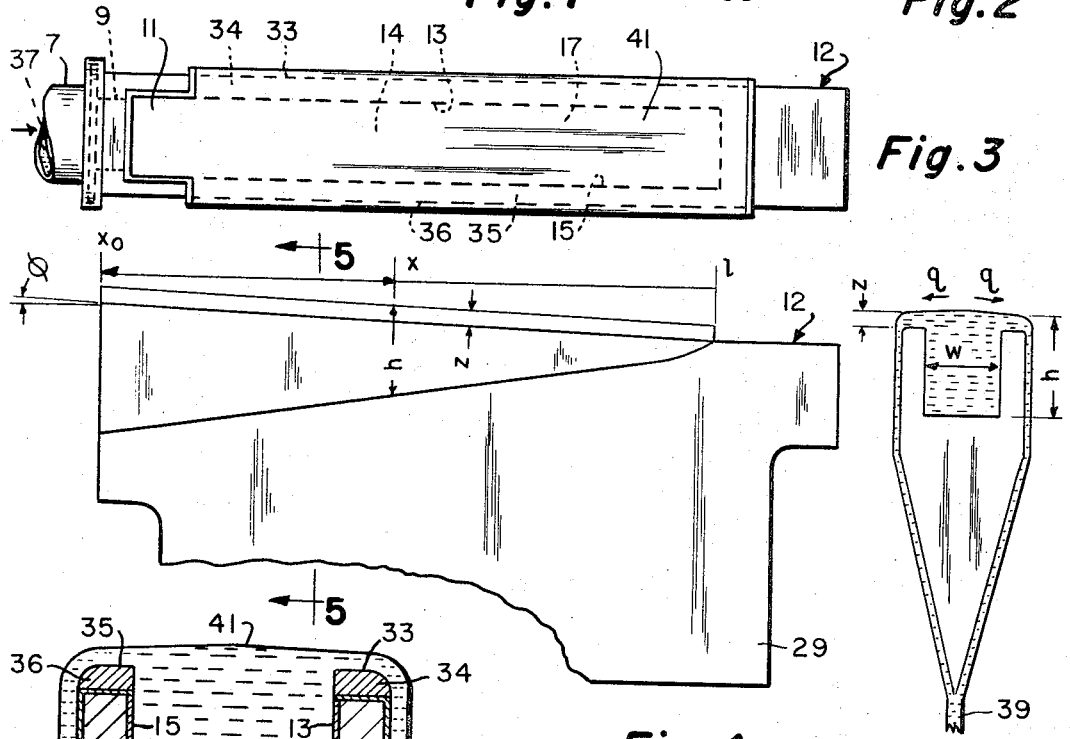
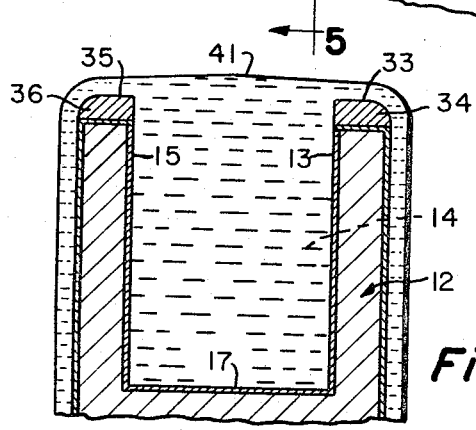
INVENTOR.
Stuart M. Dockerty
BY
ATTORNEY

United States Patent Office 3,338,696
Patented Aug. 29, 1967

3,338,696
SHEET FORMING APPARATUS
Stuart M. Dockerty, Corning, N.Y., assignor to Corning Glass Works, Corning, N.Y., a corporation of New York
Filed May 6, 1964, Ser. No. 365,321
7 Claims. (Cl. 65—145)

This invention relates to a new and improved apparatus for the production of thermoplastic sheet material. More particularly, it relates to an accurately contoured trough or weir device wherein the flow of entering thermoplastic material is programmed along its extent and divides and overflows opposite sides or weirs of the apparatus and rejoins at the bottom, thus giving virgin surfaces on each side of a resulting sheet of thermoplastic material formed thereby.

In the past, many systems have been suggested to produce sheet material by a gravity or downdraw method. One such method supplies "pot glass" between a pair of slabs extending downwardly within a central reservoir pool formed in a recessed top portion of a substantially vertically positioned former having downwardly converging sidewalls. A deleterious effect produced by this method was that a greater surge of glass would be evidenced in the immediate vicinity of the supplied pot glass producing non-uniformity. Further, waves of molten glass radiated from under the lower ends of the partially submerged slabs producing unevenness in films formed along the slab sidewalls.

Other methods feed glass into a trough from each of its ends resulting in uneven films of glass due to a surging of the molten material as it enters the trough, and the production of cord formed along the line of juncture of such end feeds. Yet another method feeds the molten material to a trough from a distance above the trough. Here the stream overflowing the trough varies in thickness as the thickness of the feed stream varies. When the feed stream plunges into the pool of molten material residing within the trough, the feed stream not only introduces seed, but also interferes with the desirable undisturbed flow of molten material from the trough over the downwardly converging sidewalls, thus producing unevenness.

My invention produces sheet glass of fire-polished surface quality and uniform thickness. The surface quality is obtained by having no contact between the glass which forms the surface of the sheet and any metal or refractory object. The invention eliminates the problem of distortion due to hydrostatic or feeding pressures by supplying the molten glass under a low glass head. Any small distortion which might occur due to pressure would be in a horizontal direction perpendicular to the axis of a feed pipe, whereas the critical dimension controlling the metering of the glass along the pipe is, of course, in the vertical direction perpendicular to the axis of the pipe. Consequently, small horizontal deflections due to internal glass pressure will not materially influence flow characteristics.

The invention also affords a simple cross-sectional shape which readily lends itself to construction from refractory with platinum cladding. Uniform thickness along the width of the sheet being produced results from the forming device having a contoured bottom surface which varies in a mathematically prescribed pattern reaching zero at the end furthest from the feed entrance. I therefore have devised a precise metering weir or overflow trough which is used to precisely dispense liquid flow from an open channel, and wherein a free surface is provided. My overflow trough, in effect, is a metering weir or dam over which the liquid material flows. A weir is a head-area rate meter wherein both the head and the area vary; the area is a function of the head.

An important factor in this process is having well-stirred glass fed to the metering weir from one end. An advantage of the one end feeding resides in the fact that uniformity of flow over sidewalls can be adjusted by adjusting the tilt of my overflow trough. This uniformity of flow would not be possible with two end feeding because it would require bending the trough in the middle. Process parameters may vary and yet product sheet material of uniform thickness across its width. A variation in the relationship between flow rate and viscosity may be compensated for by changing the angle of tilt between the longitudinal axis of the trough and the horizontal.

Of primary import in maintaining uniform thickness along the width of sheet being produced is the fact that a uniform height of glass must overflow the trough along the extent of its overflow lips. In conventional overflow devices not only does the flow rate decrease unevenly as the glass proceeds along the trough, due to friction and other flow impedances, but also the flow over each trough lip decreases along its extent. Accordingly, not only is an uneven flow rate over the lips produced, but also the height of glass overflowing the lips is not uniform along the extent of the trough.

As a solution to this problem I have devised a unique mathematically prescribed contoured bottom for maintaining a constant flow rate over the lips along the channel length. In other words, the depth of flow as it progresses along the channel is lessened or shallowed to maintain a constant flow rate over the lips along their extent and accordingly maintain a uniform height of glass flowing thereover, and thus prevent the formation of a gradually decreasing rate of flow over the lip as previously existed in known devices, which resulted in uneven thickness distribution.

The prescription of the mathematically contoured bottom, which is built into the trough has the relationship $$\frac{Q\eta}{\tan \phi} = K$$

where K is a constant. Although this relationship will be set forth in more detail hereinafter, Q is the glass flow rate supplied to the trough which may be varied by any suitable flow control means, $\eta$ is the viscosity of the glass, and $\phi$ is an angle of tilt between the plane of the two top or lip edges of the trough and the horizontal. In other words, a parameter expressed by the equation $$\frac{\text{flow} \times \text{viscosity}}{\tan \phi} = K \text{ (constant)}$$

will be provided for each given overflow trough design. It thus can be seen that the rate of flow, the viscosity of the glass, and the angle of tilt may be varied over fairly wide limits and still produce the desired constant K, which is necessary to produce uniform thickness sheet glass.

The tilt functions to change the distribution of the glass along the parallel upper surfaces of the trough and compensate for any irregularities.

Variation of the tilt angle may, if desired, also be used to produce certain specialized glass forms, such as a glass exhibiting a wedge-shaped cross section.

It thus has been an object of my invention to produce sheet glass of fire-polished surface quality and uniform thickness.

A further object of my invention is to provide an overflow trough or metering weir so contoured and designed as to enable the production of uniform sheet material of desired cross sectional thickness.

A further object of my invention is to provide a delivery channel designed for a constant viscosity, independent of exterior coolers or like devices to yield a uniform flow or product.

It is a further object of my invention to eliminate the problem of distortion in sheet material due to pressure by supplying the molten glass under a low effective glass head.

It is a further object of my invention to provide an apparatus of simple cross sectional shape which lends itself to construction from refractory with platinum cladding.

A further object of my invention is to provide an apparatus of mathematically calculated proportions for the production of sheet material of uniform thickness and of a fire-polished surface quality.

Other objects and advantages of this invention will be shown in the following detailed description of a preferred embodiment thereof as illustrated in the accompanying drawing in which:

FIG. 1 is a side elevational view, partly in section, of a sheet forming apparatus embodying the invention.

FIG. 2 is a view taken on line 2—2 of FIG. 1.

FIG. 3 is a top plan view of a sheet forming apparatus embodying the invention.

FIGS. 4 and 5 are graphical aids to the full disclosure of the invention.

FIG. 6 is an enlarged cross-section of the forming apparatus shown in FIG. 1.

Referring now to the drawings, a feed pipe 7 provides thermoplastic material, such as well-stirred glass, through circular aperture 9 to flow passage 11 of a sheet forming trough or weir device 12. The thermoplastic material has a low effective head as it flows thence into an accurately contoured upwardly-open channel 14 which precisely meters uniform liquid flow. The channel 14 is bounded by vertical interior sidewalls 13 and 15 in substantially perpendicular relationship to a contoured bottom surface 17, forming the bottom of channel 14.

The contoured bottom 17 carries a mathematically described pattern which becomes zero at its end farthest from the feed or flow passage 11. The channel portion of my metering weir device is so contoured and designed as to enable the production of thermoplastic sheet material with a constant or uniform desired cross section along its width.

The forming device 12 is shown having a cuneiform-shaped body portion 26 with oppositely disposed converging sidewalls 27 and 29. The channel 14, having the mathematically contoured bottom surface 17, is longitudinally located in the blunt upper surface of the wedge-shaped body portion 26. The trough or weir 12 may be pivotally adjusted by any suitable means, such as an adjustable roller, wedge, or cam 16 to provide a desired tilt angle $\phi$, which is the angular variation from the horizontal of parallel upper edges or surfaces 33 and 35 on sidewalls 13 and 15. The parallel upper edges may be made with removable bars, plates or dams 34 and 36, such as a platinum clad molybdenum member retained by suitable means. The dams 34 and 36 can be removed, resurfaced and reinserted while the trough is hot, merely by draining the trough below the overflow level. This removable feature facilitates the maintenance of a uniform upper surface and prevents streak and cord from forming in the sheet.

In operation, molten thermoplastic material 37, such as well-stirred glass, enters flow passage 11 from the feed pipe 7 through circular aperture 9. Because a low effective head is maintained, the molten material flows into the channel 14, having the precisely contoured bottom 17, without surge or agitation. The molten material wells over the parallel upper surfaces 33, 35 of the trough or metering weir 12, divides, and flows down each side of the oppositely disposed converging sidewalls 27 and 29 of the cuneiform body portion 26. At the bottom of the wedge portion the divided material rejoins to form a single sheet 39 with virgin surfaces of fire-polished surface quality. The fire-polished surface quality results from free surface 41 dividing and flowing down each oppositely disposed converging sidewall and forming the exterior surfaces of the single sheet 39 without having come in contact with the forming device.

The mathematically calculated channel portions of my weir device provide sheet material of uniform thickness. It will be seen that, if desired, sheet material of wedge shape cross section may be produced using the apparatus of my invention by varying tilt angle $\phi$.

The contoured channel bottom 17 is prescribed mathematically to given uniform flow over the sidewalls or weir surfaces 13, 15. The contour of the channel bottom may be expressed mathematically as:

$$\frac{\alpha^3(1-2\chi\alpha)}{\alpha_0^3(1-2\chi^0\alpha_0)}=1-\frac{x}{l}$$

where the dimensions of the various reference symbols will be found in graphical aids in FIGURES 4 and 5. The bottom contour of each trough is formed with a given flow and viscosity relationship, such that the maximum depth of thermoplastic material $z$ above the parallel upper surfaces 33 and 35 will be a constant along the entire length of the contoured metering channel. When this condition is attained the flow over the sides will be uniform along the length of the overflow trough or metering weir, thereby producing a single sheet of uniform thickness across its width.

The calculation of the contoured channel bottom of my precise metering weir develops as follows. At any point $x$ along the channel, $$Q=\frac{1}{3\eta}\frac{\partial p}{\partial x}w^4\alpha^3(1-2\chi\alpha)$$

in c.g.s. units where Q is flow in centimeters$^3$/sec., $\eta$ is the viscosity of the thermoplastic material in poises, $w$ is the channel width, $\alpha$ is the relationship of $h/w$ wherein $h$ is the effective channel depth represented by the depth of molten material, and $\partial p/\partial x$ is the pressure gradient. The term $$\chi=.6274\left[\tan h\frac{\pi}{4\alpha}+\frac{1}{243}\tan h\frac{3\pi}{4\alpha}+.00041\right]$$

in which $\alpha$, the depth to width ratio, is preferably less than 2; and the term .00041 represents the sum of the remaining terms of the infinite series for $\alpha$ equals 2 or less. Flow over the sides per centimeter length is $q=cz^3$, where $c$ is a constant, dependent on the shape of the walls over which the material flows and $z$ is the maximum depth of the thermoplastic material above surfaces 33, 35. If $q$ is to be constant then $z$ must be constant and the free surface of the material must be parallel to the straight, parallel upper surfaces 33, 35 of the sidewalls 13, 15.

If the parallel upper surfaces of the sidewalls of my metering weir are straight and at an angle to the horizontal then the pressure gradient at any point $x$ along the channel will be $$\frac{\partial p}{\partial x}=\rho g \tan \phi$$

where $\rho$ is the density of the fluid material and $g$ is 980 centimeters/sec.$^2$. The lengthwise flow along my channel with vertical interior sidewalls becomes $$Q=\frac{\rho g}{3\eta}\tan \phi w^4\alpha^3(1-2\chi\alpha)$$

Flow over the sides, per centimeter length, is $$-\frac{dQ}{dx}$$

which is a constant; therefore $$Q=Q_0\left(1-\frac{x}{l}\right)$$

where $Q_0$ is the entering flow at $x=0$, $x$ is any point along the channel, and $l$ is the channel length. But entering flow $Q_0$ is represented by the equation $$Q_0 = \frac{\rho g}{3\eta} \tan \phi w^4 \alpha_0^3 (1-2\chi_0\alpha_0)$$

where $\alpha_0$ and $\chi_0$ are the values at $x=0$. Our relationship then of $$\frac{Q}{Q_0} = \frac{\alpha^3(1-2\chi\alpha)}{\alpha_0^3(1-2\chi_0\alpha_0)} = 1 - \frac{x}{l}$$

which gives $\alpha$ and hence $h$ as a function of $x$, thus specifies the lengthwise contour of the bottom.

For a given tilt angle $\phi$, a certain flow rate $Q_1$, and viscosity $\eta_1$, my contoured metering weir will operate as described for any other flow rate $Q_2$, provided the viscosity is changed in such a way that the following relation holds, i.e., $Q_1\eta_1 = Q_2\eta_2$. The tilt changes the distribution of the glass along the upper surfaces 33 and 35. A constant prescription for the contoured bottom surface 17 is built into my sheet forming trough as a function of $$\frac{\text{flow} \times \text{viscosity}}{\tan \phi}$$

such that $$\frac{Q\eta}{\tan \phi} = \frac{\rho g}{3} w^4 \alpha^3 (1-2\chi\alpha)$$

The prescription is built into the trough with a predetermined value of $\phi$, preferably about 2°, such that the bottom edge of the wedge is horizontal. Thus if the relationship $Q_1\eta_1 = Q_2\eta_2$ is not held exactly when flow rate or viscosity change, a slight change in tilt angle $\phi$ will compensate for this deviation.

Thus by programming the bottom of the channel within the metering weir or overflow trough having vertical sides, the free surface of the molten material is maintained at a constant distance above the straight parallel upper surfaces of the weir sidewalls. Since the glass flowing over the weirs also has a tendency to seek its own level longitudinally, it is desirable to use an end dam shown in the drawing; and further since the longitudinal flow inertia necessary to provide glass at the end of the channel has a tendency to continue past the end, it is preferable to position such dam at a spaced apart position from the end of the channel. It is also within the scope of the present invention to produce a straight, flat channel bottom and contour the upper surface of the weir sidewalls according to mathematical formulation, thus producing the same end results. If desired, it is also within the scope of this invention to permit flow over only one weir sidewall, such as when feeding to a forming means where two virgin surfaces are not necessary.

The present invention is particularly suitable for use with those compositions producing hard glasses having short working ranges at high temperatures. As is known, such glasses exhibit steep viscosity curves such that a small change in temperature produces a large change in viscosity. With the applicant's device the temperature of the glass within the overflow trough is maintained constant and the flow rate to the line of draw is constant, thus producing uniform sheet thickness. With the known updraw sheet devices viscosity forces are utilized to continuously form the sheet and therefore any temperature variation along the surface of the supply chamber results in thickness variations in the resulting sheet proportional to variations in viscosity.

The sheet produced with the instant invention has virgin outside surfaces which are untouched by the forming device, thus producing a fire-polished surface quality. With the known updraw sheet forming devices the sheet is either formed by passage through a slot, resulting in mechanical surface deformation, or by upward pull from a glass surface retained in a chamber which produces surface streaks resulting from the glass to chamber interface. Not only does my novel device provide improved glass surface quality for both low viscosity glasses and hard glasses, but also glasses customarily formed by the known processes are readily adaptable for use with my improved forming method and apparatus.

Although I have described my invention with respect to certain specific embodiments thereof, I do not wish to be thereby limited, as various modifications of my invention are intended to be encompassed within its true spirit and scope as indicated by the following claims.

I claim:

1. Apparatus for forming sheet glass which cimprises, a body member having exterior sidewalls with downwardly converging portions, an upwardly open trough formed in an upper surface of said body member having bounding walls provided with linear top surfaces, said exterior sidewalls terminating at their upper extent in said top surfaces, inlet means for supplying molten glass solely to one end of said upwardly open trough below the surface of molten glass retained therein, means forming a part of said trough for providing a uniform height of molten glass overflowing said top surfaces along their extent, and said uniform height means comprising an inclined bottom surface progressively decreasing the height of such trough as it extends outwardly from said inlet means to facilitate the production of sheet glass having improved thickness uniformity across its width.

2. Apparatus for forming sheet glass as defined in claim 1 wherein said inclined bottom surface is provided with a contour which follows the relationship:

$$\frac{\text{glass flow rate} \times \text{glass viscosity}}{\tan \phi} = K$$

wherein $\phi$ is an angle of tilt between the top surfaces and the horizontal, and K is a constant which provides for a uniform thickness of glass overflowing along the extent of said top surfaces.

3. Apparatus for forming sheet glass which comprises, a body member having downwardly converging exterior sidewall portions, an upwardly open trough formed in said body member having bounding walls provided with top surfaces, the exterior wall portions of said body member terminating at their upper extent in said top surfaces, inlet means for supplying molten glass solely to one end of said upwardly open trough below the surface of molten glass retained therein; said trough having curvilinear inclined surface means, which progressively decreases the height of such trough as it extends outwardly from said inlet means, for providing a uniform height of glass overflowing said top surfaces; and said inclined surface means being contoured to follow the relationship $$\frac{\alpha^3(1-2\chi\alpha)}{\alpha_0^3(1-2\chi_0\alpha_0)} = 1 - \frac{x}{l}$$

in which $\alpha$ is a ratio determined by the effective depth of the trough to the trough width, $$\chi = .6274\left(\tan h\frac{\pi}{4\alpha} + \frac{1}{243}\tan h\frac{3\pi}{4\alpha} + .00041\right)$$

$\alpha_0$ is $\alpha$ adjacent the inlet means where $x=0$, $\chi_0$ is $\chi$ when $x=0$, $l$ is the trough length, and $x$ is an instantaneous location along the trough length from the inlet means.

4. Apparatus for producing sheet glass as defined in claim 3 including means for pivotally varying the positionment of said upper surfaces from the horizontal.

5. Apparatus for producing sheet glass as defined in claim 3 wherein said top surfaces are formed by substantially straight and parallel removable bars.

6. Apparatus for producing virgin-surfaced sheet glass comprising, a generally cuneiform-shaped body member, a longitudinally-extending overflow channel formed in an upper surface of said body member, said overflow channel having interior sidewalls terminating at their upper ends in straight parallel upper surfaces, a contoured bottom surface extending between the lower ends of said interior sidewalls and forming the bottom of said overflow channel, inlet means for supplying molten glass to said overflow channel, a pair of oppositely disposed converging sidewalls communicating at their upper ends with said parallel upper surfaces and at their lower ends at a common line of juncture, and said contoured weir bottom having a curvature which is defined by the equation $$\frac{\alpha^3(1-2\chi\alpha)}{\alpha_0^3(1-2\chi_0\alpha_0)} = 1 - \frac{x}{l}$$

in which $\alpha$ is the effective channel depth to channel width ratio, $$\chi = .6274\left(\tan h\frac{\pi}{4\alpha} + \frac{1}{243}\tan h\frac{3\pi}{4\alpha} + .00041\right)$$

$\alpha_0$ is the depth to width ratio adjacent the inlet means where $x=0$, $\chi_0$ is $\chi$ when $x=0$, $l$ is the channel length, and $x$ is an instantaneous location from the inlet means along the channel length.

7. Apparatus for forming sheet glass which comprises, a body member having exterior sidewalls with downwardly converging portions, an upwardly open trough formed in an upper surface of said body member having bounding walls provided with linear top surfaces, said exterior sidewalls terminating at their upper extent in said top surfaces, inlet means for supplying molten glass solely to one end of said upwardly open trough below the surface of molten glass retained therein, said trough having inclined bottom surface means for providing a uniform height of molten glass overflowing said top surfaces along their extent, means for varying a tilt angle between the longitudinal extent of said top surfaces and the horizontal, and said inclined bottom surface means having a contour such that for any given glass viscosity the flow rate is directly proportional to the tilt angle so as to provide for a constant overflow height of glass over said top surfaces when said tilt angle is varied.

References Cited

UNITED STATES PATENTS 1,829,641  10/1931  Ferngren _____ 65—195
3,149,949  9/1964  Dockerty et al. ____ 65—195 X S. LEON BASHORE, *Acting Primary Examiner.*

DONALL H. SYLVESTER, *Examiner.*

F. W. MIGA, *Assistant Examiner.*